(12) United States Patent
Ohya et al.

(10) Patent No.: US 10,267,421 B2
(45) Date of Patent: Apr. 23, 2019

(54) SEAL RING

(71) Applicant: KABUSHIKI KAISHA RIKEN, Tokyo (JP)

(72) Inventors: Naohisa Ohya, Niigata (JP); Junya Nagai, Niigata (JP)

(73) Assignee: KABUSHIKI KAISHA RIKEN, Tokyo (JP)

( * ) Notice: Subject to any disclaimer, the term of this patent is extended or adjusted under 35 U.S.C. 154(b) by 0 days.

(21) Appl. No.: 15/025,496

(22) PCT Filed: Sep. 17, 2014

(86) PCT No.: PCT/JP2014/074479
§ 371 (c)(1),
(2) Date: Mar. 28, 2016

(87) PCT Pub. No.: WO2015/045974
PCT Pub. Date: Apr. 2, 2015

(65) Prior Publication Data
US 2016/0238134 A1    Aug. 18, 2016

(30) Foreign Application Priority Data

Sep. 27, 2013 (JP) ................................. 2013-202372
Dec. 10, 2013 (JP) ................................. 2013-254740

(51) Int. Cl.
*F16J 15/16* (2006.01)
*F16J 15/44* (2006.01)
*F16J 15/34* (2006.01)

(52) U.S. Cl.
CPC ........... *F16J 15/162* (2013.01); *F16J 15/164* (2013.01); *F16J 15/3412* (2013.01); *F16J 15/441* (2013.01)

(58) Field of Classification Search
CPC .......... F16J 15/44; F16J 15/441; F16J 15/442; F16J 15/443; F16J 15/444; F16J 15/445;
(Continued)

(56) References Cited

U.S. PATENT DOCUMENTS 3,638,957 A * 2/1972 Marsi .................. F16J 15/3416
277/400
3,695,789 A * 10/1972 Jansson ................. F01C 21/003
277/361
(Continued)

FOREIGN PATENT DOCUMENTS

CN    101839347 A    9/2010
DE    1221865 B      7/1966
(Continued)

OTHER PUBLICATIONS

International Search Report in International Application No. PCT/JP2014/074479, filed Sep. 17, 2014.
(Continued)

*Primary Examiner* — Kristina R Fulton
*Assistant Examiner* — L. Susmitha Koneru
(74) *Attorney, Agent, or Firm* — Saliwanchik, Lloyd & Eisenschenk

(57) ABSTRACT

A seal ring includes a center axis, an outer peripheral surface, an inner peripheral surface, a side surface, and a groove. The center axis is a rotation center. The outer peripheral surface is an outward cylindrical surface whose center is positioned at the central axis. The inner peripheral surface is an inward cylindrical surface disposed between the center axis and the outer peripheral surface whose center is positioned at the central axis. The side surface connects the outer peripheral surface and the inner peripheral surface. The groove is formed in a dented groove from the side surface, extends along a radial direction spaced from the
(Continued)

outer peripheral surface, has a first end connected to the inner peripheral surface and a second end at an opposite side of the first end, and returns oil entered from the first end to an inner peripheral surface side via the second end.

15 Claims, 12 Drawing Sheets

(58) Field of Classification Search
CPC ...... F16J 15/34; F16J 15/3404; F16J 15/3408; F16J 15/3412; F16J 15/3416; F16J 15/342; F16J 15/3424; F16J 15/3428; F16J 15/3432; F16J 15/162
See application file for complete search history.

(56) References Cited

U.S. PATENT DOCUMENTS

| | | | | |
|---|---|---|---|---|
| 4,451,050 A * | 5/1984 | Repella | ............... | F16J 15/3244 |
| | | | | 277/559 |
| 4,733,873 A | 3/1988 | Takenaka et al. | | |
| 5,092,612 A * | 3/1992 | Victor | ............... | F16J 15/3412 |
| | | | | 277/400 |
| 5,145,189 A * | 9/1992 | Pope | ............... | F16J 15/441 |
| | | | | 277/544 |
| 5,222,743 A * | 6/1993 | Goldswain | ............ | F16J 15/3412 |
| | | | | 277/400 |
| 5,492,341 A * | 2/1996 | Pecht | ............... | F16J 15/3412 |
| | | | | 277/400 |
| 5,498,007 A * | 3/1996 | Kulkarni | ............... | F16J 15/3412 |
| | | | | 277/366 |
| 5,509,664 A * | 4/1996 | Borkiewicz | ............ | F16J 15/442 |
| | | | | 277/543 |
| 5,556,111 A * | 9/1996 | Sedy | ............... | F16J 15/3412 |
| | | | | 277/400 |
| 5,722,665 A * | 3/1998 | Sedy | ............... | F16J 15/3412 |
| | | | | 277/400 |
| 5,941,532 A * | 8/1999 | Flaherty | ............... | F16J 15/3412 |
| | | | | 277/399 |
| 6,142,478 A * | 11/2000 | Pecht | ............... | F16J 15/3484 |
| | | | | 277/400 |
| 6,152,452 A * | 11/2000 | Wang | ............... | F16J 15/3412 |
| | | | | 277/399 |
| 6,189,896 B1 | 2/2001 | Dickey et al. | | |
| 6,575,470 B1 * | 6/2003 | Gacek | ............... | F16J 15/3412 |
| | | | | 277/399 |
| 7,494,130 B2 * | 2/2009 | Berdichevsky | ...... | F16J 15/3244 |
| | | | | 277/400 |
| 7,775,528 B2 * | 8/2010 | Berdichevsky | ...... | F16J 15/3244 |
| | | | | 277/559 |
| 7,780,399 B1 * | 8/2010 | Garrison | ............... | F01D 25/183 |
| | | | | 277/400 |
| 8,342,534 B2 * | 1/2013 | Vasagar | ............... | F16J 15/3244 |
| | | | | 277/399 |
| 8,757,632 B2 * | 6/2014 | Dobosz | ............... | F16J 15/3412 |
| | | | | 277/399 |
| 2008/0106042 A1 * | 5/2008 | Roddis | ............... | F16J 15/441 |
| | | | | 277/399 |
| 2011/0227290 A1 * | 9/2011 | Roddis | ............... | F16J 15/3404 |
| | | | | 277/408 |
| 2012/0018957 A1 | 1/2012 | Watanabe | | |
| 2013/0200573 A1 * | 8/2013 | Garrison | ............... | F16J 9/24 |
| | | | | 277/457 |
| 2014/0203517 A1 * | 7/2014 | Ferris | ............... | F16J 15/3412 |
| | | | | 277/400 |
| 2014/0239598 A1 * | 8/2014 | Hisada | ............... | F16J 15/3204 |
| | | | | 277/394 |

FOREIGN PATENT DOCUMENTS

| | | | | |
|---|---|---|---|---|
| FR | 2675560 A1 * | 10/1992 | ............ | F01D 11/025 |
| JP | 05-61566 U | 8/1993 | | |
| JP | 2000-310336 A | 11/2000 | | |
| JP | 2000310336 A | 11/2000 | | |
| JP | 2002276815 A | 9/2002 | | |
| WO | WO-2004090390 A1 | 10/2004 | | |
| WO | WO-2011/105513 A1 | 9/2011 | | |
| WO | WO-2011105513 A1 | 9/2011 | | |
| WO | WO-2011162283 A1 | 12/2011 | | |
| WO | WO-2013094654 A1 | 6/2013 | | |
| WO | WO-2013094657 A1 | 6/2013 | | |

OTHER PUBLICATIONS

Extended European Search Reported dated Feb. 16, 2017 in European Application No. 14849736.5.
Office Action dated May 2, 2018 in Chinese Application No. 201480052722.X, with its English translation.
Office Action dated Apr. 24, 2018 in Japanese Application No. 2015-539134, with its English translation.
Japanese Office Action dated Oct. 30, 2018 in Japanese Application No. 2015-539134, along with its English translation.

* cited by examiner

SEAL RING

CROSS-REFFERENCE TO RELATED APPLICATIONS

This application is the U.S. national stage application of International Patent Application No. PCT/JP2014/074479, filed Sep. 17, 2014, which claims priority to Japanese Application Nos. 2013-202372, filed Sep. 27, 2013, and 2013-254740, filed Dec. 10, 2013, the disclosures of each of which are incorporated herein by reference in their entirety.

TECHNICAL FIELD

The present invention relates to a seal ring used in oil hydraulic equipment.

BACKGROUND ART

It is known that a variety of oil hydraulic equipment such as an oil hydraulic automatic transmission is mounted on an automobile. In such an automobile, a drive loss of oil hydraulic equipment is desirably reduced in order to improve fuel efficiency.

In the oil hydraulic automatic transmission, a seal ring is used. The seal ring is fitted into a shaft inserted into a housing, and seals between the housing and the shaft. Upon driving the automatic transmission, when the shaft rotates to the housing (or when the housing rotates to the shaft), a friction loss is generated between the seal ring and the housing or between the seal ring and the shaft.

Such a friction loss leads to a drive loss of the oil hydraulic equipment. Accordingly, a demanding technology is to decrease the friction loss.

Patent Documents 1 to 5 disclose a technology to decrease the friction loss generated between the seal ring and the shaft. The seal ring disclosed in each Patent Document has a groove on a surface being in contact with the shaft.

If the oil hydraulic pressure is applied to the seal ring, oil enters into the groove. The oil entered into the groove applies a force to the seal ring in a direction away from the shaft. This inhibits a force applied between the seal ring and the shaft, thereby decreasing the friction loss generated between the seal ring and the shaft.

PATENT DOCUMENT

[Patent Document 1] PCT International Publication No. 2011/105513
[Patent Document 2] PCT International Publication No. 2004/090390
[Patent Document 3] PCT International Publication No. 2011/162283
[Patent Document 4] PCT International Publication No. 2013/094654
[Patent Document 5] PCT International Publication No. 2013/094657

SUMMARY OF INVENTION

Problem to be Solved by the Invention

In the above-described technologies, the oil entered into the groove of the seal ring may enter between the seal ring and the shaft, and may form an oil film between the seal ring and the shaft. By the formation of the oil film, lubricity of the seal ring is improved and the friction loss is decreased.

On the other hand, if the oil film is too thick, the oil is easily leaked from the seal ring to outside.

In view of the above-described circumstances, an object of the present invention is to provide a seal ring such that an oil leak can be inhibited while a friction loss is decreased.

Means for Solving the Problem

A seal ring according to a first aspect of the present invention includes a center axis, an outer peripheral surface, an inner peripheral surface, a side surface, and a groove.

The center axis is a rotation center.

The outer peripheral surface is an outward cylindrical surface whose center is positioned at the central axis.

The inner peripheral surface is an inward cylindrical surface disposed between the center axis and the outer peripheral surface whose center is positioned at the central axis.

The side surface connects the outer peripheral surface and the inner peripheral surface.

The groove is formed in a dented groove from the side surface, extends along a radial direction spaced from the outer peripheral surface, has a first end connected to the inner peripheral surface and a second end at an opposite side of the first end, and returns oil entered from the first end to an inner peripheral surface side via the second end.

By the configuration, as oil enters into the groove, a friction loss is reduced. Also, as the oil entered into the groove from the first end is returned to the inner peripheral surface side via the second end, an oil leak to the outer peripheral surface side of the seal ring is difficult to be generated.

The second end may be connected to the inner peripheral surface.

By the configuration, the oil entered into the groove is discharged from the second end to the inner peripheral surface side of the seal ring.

The groove may have a top with a shallowest depth from the side surface.

By the configuration, a flow channel of the groove is shallowed from the first end to the top. This increases a force applied from the oil in the groove to the seal ring from the first end to the top of the groove, thereby effectively decreasing a friction loss.

Also, by the configuration, the flow channel of the oil from the top to the second end the groove becomes wide. This allows the oil passed through the top to easily flow from the top to the second end, thereby easily discharging the oil from the second end of the groove to the inner peripheral surface side of the seal ring.

A depth of the groove from the side surface may be successively shallow from the first end to the top.

By the configuration, the oil flows more smoothly to the groove.

The width of the groove may be successively narrowed down from the first end to the top.

By the configuration, the flow channel of the oil is narrowed from the first end to the top of the groove. This increases a force applied from the oil in the groove to the seal ring from the first end to the top of the groove, thereby effectively decreasing a friction loss.

Also, by the configuration, the flow channel of the oil from the top to the second end of the groove becomes wide. This allows the oil passed through the top to easily flow from the top to the second end, thereby easily discharging the oil from the second end of the groove to the inner peripheral surface side of the seal ring.

The groove may be configured of a first groove and a second groove.

Also, the first groove and the second groove may share the first end 113, and the second ends are disposed at opposite sides across the first end.

By the configuration, a friction loss is advantageously decreased not depending on the rotation direction of the seal ring.

A plurality of the grooves may be disposed to have a rotational symmetry as to the center axis.

By the configuration, a force applied from the oil in the groove to the seal ring becomes uniform around a whole perimeter of the seal ring. This allows a friction loss to be decreased uniformly around the whole perimeter of the seal ring.

The groove may have a pocket extending between the first end and the second end, and an undercut extending from the first end in a direction opposite to pocket.

By the configuration, as the oil at the inner peripheral surface side of the seal ring enters into the pocket, a friction loss is decreased. Also, the oil in the pocket is not leaked out from the outer peripheral surface, and flow along the undercut. Accordingly, by this configuration, an oil leak is difficult to be generated to the outer peripheral surface side of the seal ring.

A width of the pocket may be shallowest at the second end.

A width of the undercut may be equivalent to a width of the second end.

By the configuration, a width of the pocket is narrowed along a flow direction of the oil. This increases a force applied from the oil in the pocket to the seal ring along the flow direction of the oil. Accordingly, by this configuration, a friction loss can be decreased more effectively.

Also, by the configuration, as a width of the undercut is similar to a width of the second end of the groove, the oil flowed in the groove to the second end may be discharged smoothly along the undercut.

A depth of the pocket may be shallowest at the second end.

A depth of the undercut may be equivalent to the second end.

By the configuration, a depth of the pocket becomes shallow along a flow direction of the oil. This increases a force applied from the oil in the pocket to the seal ring along the flow direction of the oil. Accordingly, by this configuration, a friction loss can be decreased more effectively.

Also, by the configuration, as a depth of the undercut is similar to a depth of the second end, the oil flowed in the groove to the second end may be discharged smoothly along the undercut.

The undercut may extend to the inner peripheral surface.

By the configuration, the oil flowed in the groove to the second end may be discharged to the inner peripheral surface side along the undercut. Accordingly, by this configuration, an oil leak is difficult to be generated to the outer peripheral surface side of the seal ring.

The undercut may pierce through the inner peripheral surface.

By the configuration, the oil flowed in the groove to the second end flows to the inner peripheral surface of the seal ring along the undercut. Accordingly, the oil may be discharged smoothly to the inner peripheral surface side of the seal ring.

The undercut may be disposed spaced from the inner peripheral surface.

By the configuration, as the undercut does not pierce through the inner peripheral surface, a corner of the undercut of the undercut is prevented from chipping, and oil is prevented from back flowing from the inner peripheral surface to the undercut.

A plurality of the grooves may be disposed successively along the radial direction.

By the configuration, as oil enters into a plurality of the pockets, a friction loss can be decreased more effectively.

The undercut of the groove may extend to the pocket of a groove of an adjacent groove.

By the configuration, the oil flowed in the groove to the second end flows to a pocket of an adjacent groove along the undercut. Accordingly, by this configuration, as the oil circulates within a plurality of the grooves of the seal ring, an oil leak to the outer peripheral surface side of the seal ring is difficult to be generated.

The undercut may pierce through the pocket of the adjacent groove.

By the configuration, oil flowed in the groove to the second end flows to a pocket of a groove adjacent along the undercut. Accordingly, by the configuration, the oil flows smoothly to a pocket of an adjacent groove.

The undercut may be disposed spaced from the pocket of the adjacent groove.

By the configuration, as the undercut does not pierce through the inner peripheral surface, a corner of the undercut of the undercut is prevented from chipping, and oil is prevented from back flowing from the inner peripheral surface to the undercut.

Effects of the Invention

It is possible to provide a seal ring such that an oil leak can be inhibited while a friction loss is decreased.

MODES FOR CARRYING OUR THE INVENTION

Hereinafter, referring to drawings, embodiments of the present technology will be described.

<First Embodiment>

[Seal Mechanism]

Figure 1:
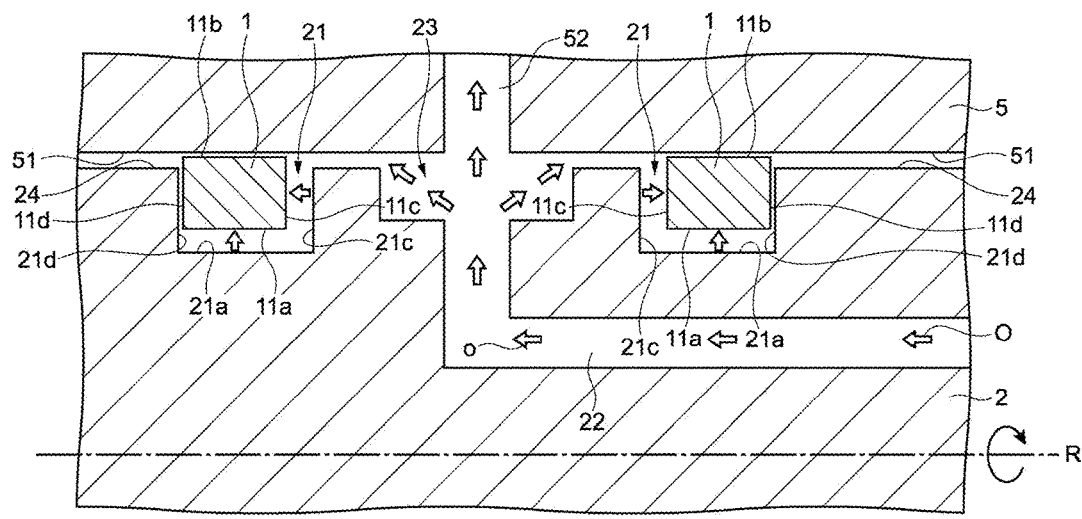
FIG. 1 A cross-sectional diagram of a seal mechanism according to a first embodiment of the present invention.

FIG. 1 is a cross-sectional diagram of a seal mechanism according to a first embodiment of the present invention. The seal mechanism according to this embodiment is applicable to oil hydraulic equipment such as an oil hydraulic automatic transmission.

The seal mechanism according to this embodiment includes a shaft 2, a housing 5 and a seal ring 1. The shaft 2 is configured as a columnar axis member being rotatable around a center axis R. The shaft 2 is inserted into the housing 5, and an inner peripheral surface 51 of the housing 5 faces to an outer peripheral surface 24 of the shaft 2. The shaft 2 and the housing 5 are relatively rotatable around the center axis R. That is to say, the shaft 2 may rotate to the housing 5, or the housing 5 may be rotated to the shaft 2.

In the shaft 2, there is provided a flow channel 22 through which oil flows. The flow channel 22 extends from a longitudinal direction end along the center axis R and bends to the outer peripheral surface 24. At an end at an outer peripheral surface 24 side of the flow channel 22, a liquid chamber 23 is disposed. Oil fed from the longitudinal direction end of the shaft 2 is lead to the liquid chamber 23 along the flow channel 22.

In the housing 5, there is disposed a flow channel 52 extending from a position facing to the liquid chamber 23 of the shaft 2 in the inner peripheral surface 51 to an outer peripheral side. Accordingly, oil flowed through the flow channel 22 of the shaft 2 and reached the liquid chamber 23 enters into the flow channel 52 of the housing 5. Oil within the flow channel 52 of the housing 5 flows to an outer peripheral side of the housing 5.

In this manner, the flow channel 22 of the shaft 2 and the flow channel 52 of the housing 5 configure an oil flow channel that can feed oil from the shaft 2 to the housing 5. In FIG. 1, a flow of oil is represented by block arrows o.

The shaft 2 and the housing 5 are formed of a metal material such as an iron-based material and an aluminum alloy material. Accordingly, the shaft 2 is not in contact with the housing 5, there is a play (space) between the outer peripheral surface 24 of the shaft 2 and the inner peripheral surface 51 of the housing 5. Therefore, oil flows from the liquid chamber 23 into the space between the shaft 2 and the housing 5 when the oil flows from the flow channel 22 of the shaft 2 to the flow channel 52 of the housing 5.

If oil in an oil pump is decreased, an oil hydraulic pressure within the flow channels 22, 52 is decreased. If the oil hydraulic pressure of the flow channels 22, 52 is decreased, a transmission may not be performed correctly in an automatic transmission, for example. Although a large-sized oil pump that can compensate the decrease in the oil hydraulic pressure may be used, a drive loss is increased as the size of the oil pump is enlarged.

In this embodiment, in order to prevent the oil flowed into the space between the shaft 2 and the housing 5 from leaking along the outer peripheral surface 24 of the shaft 2, the seal ring 1 is disposed for sealing the space between the shaft 2 and the housing 5.

The shaft 2 has the fitting groove 21 formed around a whole perimeter of the outer peripheral surface 24 at both sides of the center axis R of the liquid chamber 23. The seal ring 1 is fitted into the fitting groove 21 of the shaft 2.

The seal ring 1 has an inner peripheral surface 11a, an outer peripheral surface 11b, and side surfaces 11C, 11d. The inner peripheral surface 11a is an inward cylindrical surface whose center is positioned at the central axis R, and the outer peripheral surface 11b is an outward cylindrical surface whose center is positioned at the central axis R. The side surfaces 11C, 11d are parallel each other, and orthogonal to the inner peripheral surface 11a and the outer peripheral surface 11b, respectively.

Oil flowed into the space between the shaft 2 and the housing 5 then flows into the fitting groove 21. The oil hydraulic pressure in the fitting groove 21 is mainly applied to the inner peripheral surface 11a of the seal ring 1 and the side surface 11c at a liquid chamber 23 side.

The outer peripheral surface 11b of the seal ring 1 is forced to the inner peripheral surface 51 of the housing 5 by the oil hydraulic pressure applied to the inner peripheral surface 11a from oil. In this manner, the contact between the outer peripheral surface 11b of the seal ring 1 and the inner peripheral surface 51 of the housing 5 is kept.

In addition, the side surface 11d opposite to the side surface 11c of the seal ring 1 is forced to a side surface 21d distant from the liquid chamber 23 of the fitting groove 21 of the shaft 2 by the oil hydraulic pressure applied to the side surface 11c by the oil. In this manner, the contact between the side surface 11d of the seal ring 1 and the side surface 21d of the fitting groove 21 of the shaft 2 is kept.

As the seal ring 1 is in contact with the housing 5 and the shaft 2, the seal ring 1 seals the space between the shaft 2 and the housing 5. In this manner, the oil flowed into the space between the shaft 2 and the housing 5 from leaking to outside of the seal ring 1.

As described above, in the configuration shown in FIG. 1, the seal ring 1 is forced to the inner peripheral surface 51 of the housing 5 and the side surface 21d of the fitting groove 21 of the shaft 2. Accordingly, when the seal ring 1 rotates to the housing 5 or the shaft 2, a frictional force acts between the seal ring 1 and the housing 5, and between the seal ring 1 and the shaft 2.

The frictional force causes a friction loss if the shaft 2 and the housing 5 rotate. The seal ring 1 according to this embodiment has a configuration that inhibits the frictional force between the seal ring 1 and the shaft 2 in order to decrease the friction loss.

[Seal Ring 1]

Figure 2:
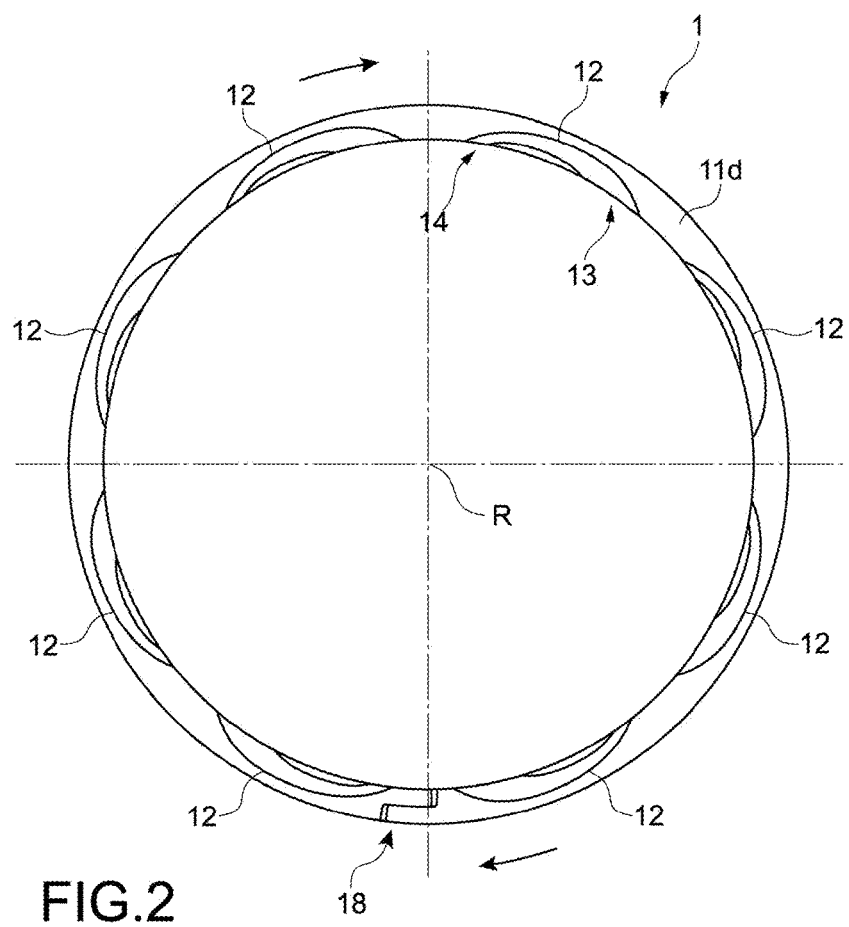
FIG. 2 A plan diagram of the seal ring shown in FIG. 1.
Figure 3:
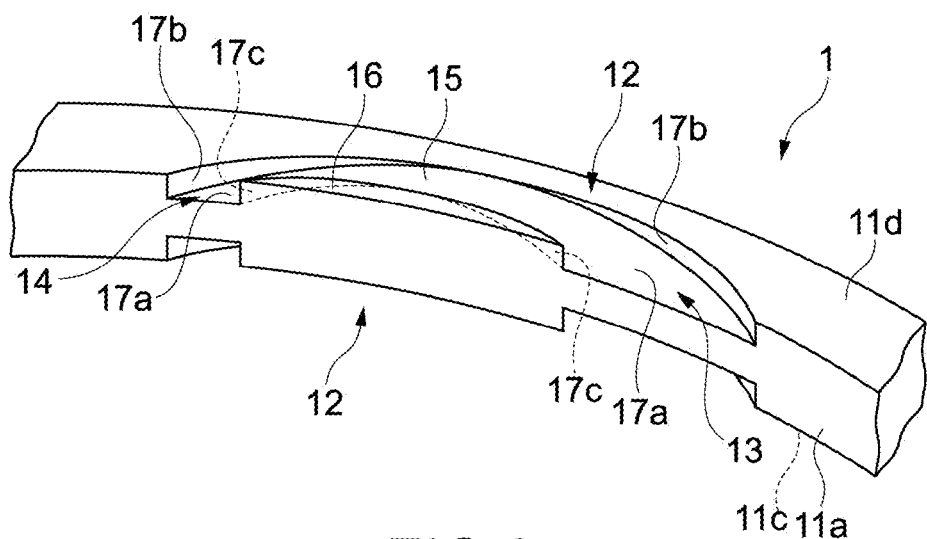
FIG. 3 A partially perspective diagram of the seal ring.

FIG. 2 and FIG. 3 show the seal ring 1 according to this embodiment. FIG. 2 is a plan diagram, and FIG. 3 is a partially perspective diagram.

FIG. 2 shows an overall appearance of the seal ring 1. At the side surface 11d of the seal ring 1, eight grooves 12 are formed. The eight grooves 12 are disposed at an equal interval, and have a 45-degree rotational symmetry as to the center axis R.

In order to mount the seal ring 1 easily to the fitting groove 21 of the shaft 2, an abutment 18 is disposed. If a force is applied to the seal ring 1 in a radial direction, the seal ring 1 is elastically deformed to open the abutment 18. The seal ring 1 is attached to the fitting groove 21 of the shaft 2 with the abutment 18 open.

The abutment 18 can inhibit oil from leaking from the abutment 18. The shape of the abutment 18 is not especially limited, and may take any known shape. The abutment 18 may be selected from a right-angle (straight) abutment, an oblique (angled) abutment, a shoulder (stepped) abutment, a double-angled abutment, a double-cut abutment and a triple-stepped abutment, for example. In the case of the double-angled abutment, the double-cut abutment and the triple-stepped abutment, oil is well inhibited from leaking from the abutment 18.

Any material for forming the seal ring 1 may be selected, as appropriate. For example, the seal ring 1 is formed from a variety of resin materials and a resin material with which an additive such as carbon powder and carbon fiber is filled.

Examples of the resin materials inlcude thermoplastic resin such as polyether ether ketone (PEEK) and polyphenylene sulfide (PPS). Furthermore, the resin material may be fluororesin such as polyimide (PI), polytetrafluoroethyelne (PTFE), modified polytetrafluoroethyelne and ethylenetetrafluoroethylene (ETFE).

In FIG. 3, the groove 12 of the seal ring 1 is shown enlarged. The groove 12 is formed on the side surface 11*c* opposite to the side surface 11*d* of the seal ring 1. The groove 12 on the side surface 11*c* and the groove 12 on the side surface 11*d* are formed in a mirror-symmetry manner. Accordingly, the groove 12 on the side surface 11*c* will be described, and the description about the groove 12 on the side surface 11*d* will be omitted.

The groove 12 has two first end 13 and second end 14 connected to the inner peripheral surface 11*a*. Cross-sections of the ends 13, 14 at the inner peripheral surface 11*a* are rectangle. A width of the inner peripheral surface 11*a* in a radial direction is wider at the first end 13 than at the second end 14. Depths of the ends 13, 14 from the side surface 11*d* are about ¼ of the seal ring 1.

The groove 12 extends in an arc shape between the ends 13, 14. The width of the groove 12 is successively narrowed down along an extension direction from the first end 13 to the second end 14. The groove 12 has a bottom surface 17*a*, an outer peripheral surface 17*b*, and an inner peripheral surface 17*c*. In the seal ring 1, there is formed an inner peripheral wall 16 by the inner peripheral surface 17*c* of the groove 12 and the inner peripheral surface 11*a* of the seal ring 1.

The groove 12 has a top 15 with a shallowest depth from the side surface 11*d*. The groove 12 is placed at a center area between the ends 13, 14. In this embodiment, the depth from the side surface 11*d* at the top 15 is zero, i.e., the top 15 is included in the side surface 11*d*. Alternatively, the top 15 may be dented from the side surface 11*d*.

The depth of the groove 12 from the side surface 11*d* becomes successively shallow from the first end 13 to the top 15, and becomes successively thick from the top 15 to the second end 14. That is to say, the height of the bottom surface 17*a* of the groove 12 becomes successively high from the first end 13 to the top 15, and becomes successively low from the top 15 to the second end 14.

Figure 4:
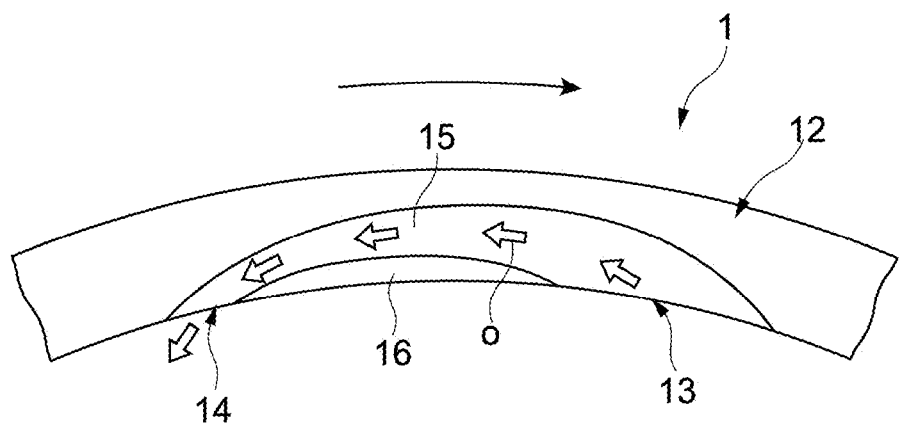
FIG. 4 A partially plan diagram of the seal ring.

FIG. 4 is a diagram showing a flow of oil in the groove 12. In FIG. 4, the flow of oil in the groove 12 is shown by a block arrow o when the seal ring 1 is rotated in the arrow direction in FIG. 2.

When the seal ring 1 is rotated in the arrow direction, oil tries to stay at the position by an inertial force, and the oil therefore flows through the groove 12 in a direction opposite to a rotation direction of the seal ring 1. In other words, when the seal ring 1 is rotated clockwise, oil apparently flows through the groove 12 in a left direction.

When oil enters into the groove 12, a force corresponding to the oil hydraulic pressure is applied to the bottom surface 17*a* of the groove 12.

In addition, the bottom surface 17*a* of the groove 12 is a slope ascendant from the first end 13 to the top 15. Therefore, when oil flows from the first end 13 to the top 15, a flow channel of oil is gradually narrowed down by the bottom surface 17*a* of the groove 12. Accordingly, a force corresponding to a flow rate of oil is applied to the bottom surface 17*a* of the groove 12.

Thus, the force corresponding to the oil hydraulic pressure and the force corresponding to a flow rate of oil are applied to the bottom surface 17*a* of the groove 12.

In addition, the bottom surface 17*a* is narrowed down from the first end 13 to the top 15 and the width is also narrowed down. When oil flow from the first end 13 to the top 15, the flow channel of oil is successively narrowed down. Accordingly, when oil flows from the first end 13 to the top 15, the flow rate of oil is gradually increased. As the flow rate of oil is increased, a force applied from oil to the bottom surface 17*a* of the groove 12 is increased.

Note that the width of the groove 12 is not necessarily narrowed down from the first end 13 to the top 15, the width of the groove 12 may be uniform from the first end 13 to the top 15.

Once oil passes through the top 15, oil flows to the second end 14. The groove 12 is formed such that a cross-section area of the flow channel of oil successively becomes wide from the top 15 to the second end 14.

Although the width of the groove 12 is narrowed down from the top 15 to the second end 14, the bottom surface 17*a* of the groove 12 is deepen from the top 15 to the second end 14, thereby opening the flow channel of oil from the top 15 to the second end 14. Accordingly, oil flows smoothly from the top 15 to the second end 14, and is discharged from the second end 14 to an inner peripheral surface 11*a* side of the seal ring 1.

Note that the groove 12 of the seal ring 1 may be only formed such that a cross-section area of the flow channel of oil is increased from the top 15 to the second end 14, and the width of the groove 12 may be uniform from the top 15 to the second end 14, or may be increased from the top 15 to the second end 14.

Figure 5:
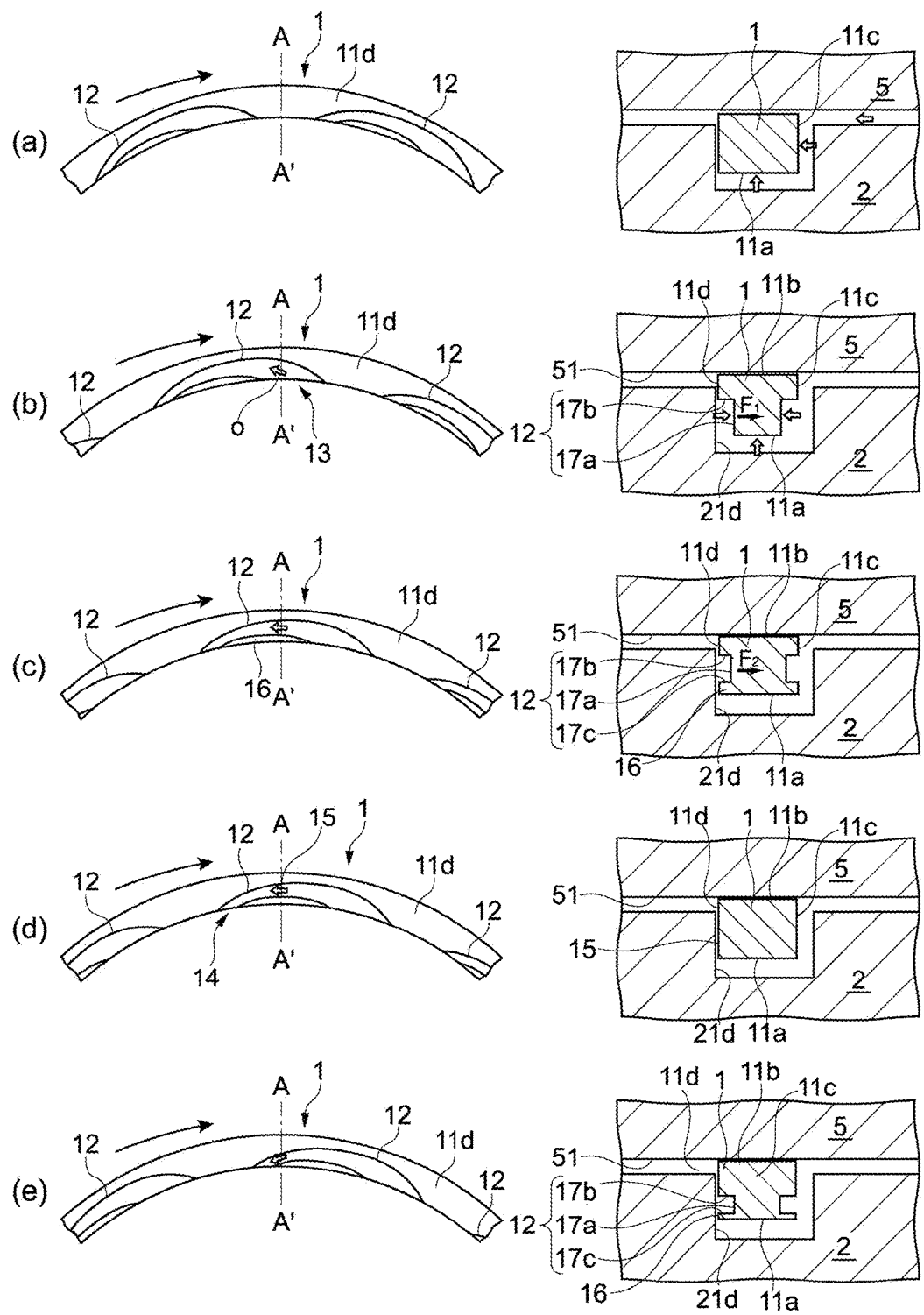
FIG. 5 A diagram showing an effect of oil on the seal ring.

FIGS. 5 are partially plan diagrams (left diagrams) of the seal ring 1 and cross-sectional diagrams (right diagrams) along A-A' lines of the partially plan diagrams. The left diagrams in FIGS. 5 correspond to a part in FIG. 2, and the right diagrams in FIGS. 5 correspond to the seal ring 1 and adjacent parts thereof in FIG. 1.

FIGS. 5(*a*) to (*e*) each shows a shape change of the cross-section along the A-A' line accompanied by the rotation of the seal ring 1. In each FIG. 5, the cross-section of the seal ring 1 along the A-A' line is focused on. In all cross-sections of the seal ring 1, shape changes similar to those in the cross-sections along an A-A' lines are repeated.

In FIG. 5(*a*), as shown in the left drawing, the A-A' line is positioned between the grooves 12, as shown in the right drawing, a cross-sectional shape of the seal ring 1 is rectangle. In the cross-section, the side surface 11*c* and the inner peripheral surface 11*a* of the seal ring 1 receive the oil hydraulic pressure. That is to say, a leftward force is applied to the side surface 11c, and an upward force is applied to the inner peripheral surface 11a in the seal ring 1.

In FIG. 5(b), the seal ring 1 is rotated a little in the arrow direction from the state shown in FIG. 5(a), and the A-A' line is positioned at the first end 13 of the groove 12. Accordingly, as shown in the right diagram of FIG. 5(b), the groove 12 appears on the cross-sectional shape of the seal ring 1. Specifically, parts at an inner peripheral surface 11a side of the side surfaces 11c, 11d are dented, and the cross-sectional shape of the seal ring is T-shaped.

In the cross-section shown in FIG. 5(b), a force corresponding to the oil hydraulic pressure is applied to the bottom surface 17a of the groove 12 from oil entered into the groove 12 at the side surface 11d side. In addition, as described above, the force corresponding to the flow rate of oil is applied to the bottom surface 17a of the groove 12. In FIG. 5(b), the force applied to the bottom surface 17a of the groove 12 at the side surface 11d side from oil is represented by $F_1$.

Also, in the cross-section shown in FIG. 5(b), the shapes of the side surface 11c and the inner peripheral surface 11a of the seal ring 1 are changed by forming the groove 12. However, a force similar to that in the cross-section shown in FIG. 5(a) is applied. That is to say, also in the cross-section shown in FIG. 5(b), the leftward force and the upward force are applied to the seal ring 1 similar to the forces applied to the side surface 11c and the inner peripheral surface 11a of the seal ring 1 in the cross-section shown in FIG. 5(a).

Accordingly, the force received from oil in the seal ring 1 in the cross-section shown in FIG. 5(b) is different from that in the cross-section shown in FIG. 5(a) by the force $F_1$. As the force $F_1$ works to the right on the bottom surface 17a of the groove 12, a part of the force to the left applied to the seal ring 1 is offset in the cross-section shown in FIG. 5(b).

In FIG. 5(c), the seal ring 1 is rotated a little in the arrow direction from the state shown in FIG. 5(b), and the A-A' line is positioned at the inner peripheral wall 16. Accordingly, as shown in the right diagram of FIG. 5(c), the inner peripheral wall 16 appears on the cross-sectional shape of the seal ring 1. Also, in the cross-section shown in FIG. 5(c), the bottom surface 17a of the groove 12 is shallower than that in the cross-section shown in FIG. 5.

The flow rate of oil in the cross-section shown in FIG. 5(c) is higher than that in the cross-section shown in FIG. 5(b), and a rightward force $F_2$ applied to the bottom surface 17a of the groove 12 from oil is greater than the force $F_1$. Thus, in the seal ring 1, the force applied to the bottom surface 17a of the groove 12 from oil is increased from the first end 13 to the top 15.

Accordingly, in the seal ring 1, by an effect of the force $F_1$ and force $F_2$ from oil, the force forced to the side surface 21d of the fitting groove 21 of the shaft 2 is inhibited. In other words, a normal force applied to the shaft 2 from the seal ring 1 is decreased. Accordingly, in the seal ring 1, a frictional force between the seal ring 1 and the shaft 2 is inhibited.

In FIG. 5(d), the seal ring 1 is rotated a little in the arrow direction from the state shown in FIG. 5(c), the A-A' line is positioned at the top 15. In the top 15, the depth of the groove 12 becomes zero. As shown in FIG. 5(c), the groove 12 does not appear on the cross-sectional shape of the seal ring 1, the cross-sectional shape of the seal ring 1 becomes rectangle.

In FIG. 5(e), the seal ring 1 is rotated a little in the arrow direction from the state shown in FIG. 5(d). In the state shown in FIG. 5(e), the groove 12 appears again on the cross-sectional shape of the seal ring 1, and oil passing through the top 15 is discharged from the second end 14 to the inner peripheral surface 11a side of the seal ring 1.

Thus, in the seal ring 1, oil entered into the groove 12 from the first end 13 returns to the inner peripheral surface 11a side of the seal ring 1 from the second end 14. Accordingly, oil in the groove 12 is inhibited from passing through between the seal ring 1 and the shaft 2 and from leaking to an outer peripheral surface 11b side of the seal ring 1.

Note that any depth of the bottom surface 17a of the groove 12 in the seal ring 1 may be used, as appropriate. For example, the depth of bottom surface 17a of the groove 12 may be uniform. That is to say, the groove 12 may not include top 15. In this case, the force corresponding to the flow rate of oil is not applied to the bottom surface 17a of the groove 12, but the force corresponding to the oil hydraulic pressure of oil is applied thereto. Accordingly, a frictional force between the seal ring 1 and the shaft 2 is inhibited.

The depth of the bottom surface 17a from the first end 13 to the top 15 of the groove 12 in the seal ring 1 may be successively shallow, but may be gradually shallow. The depth of the bottom surface 17a from the top 15 to the second end 14 of the groove 12 in the seal ring 1 may be successively deepen, but may be gradually deepen. Furthermore, the groove 12 of the seal ring 1 may be formed in a fixed depth from a position exceeding the top 15 to the second end 14.

In addition, as shown in FIG. 2, the seal ring 1 has eight grooves 12 disposed at an equal interval, but the number of the grooves 12 of the seal ring 1 may be determined, as appropriate. However, a plurality of the grooves 12 of the seal ring 1 have desirably a rotational symmetry as to the center axis R in order not to deviate the force applied to the seal ring 1. For example, the seal ring 1 may have three grooves 12 disposed at an equal interval. In this case, the three grooves 12 have a 120-degree rotational symmetry as to the center axis R.

Also, as shown in FIG. 1, the cross-sectional shape of the seal ring 1 is rectangle. However, any cross-sectional shape of the seal ring 1 may be used, as appropriate. For example, the width of the inner peripheral surface 11a of the seal ring 1 is narrower than the width of the outer peripheral surface 11b. In this case, the cross-sectional shape of the seal ring 1 becomes a trapezoid, and a space is formed between the side surface 11d of the seal ring 1 and the side surface 21d of the fitting groove 21 of the shaft 2. Therefore, the oil hydraulic pressure always acts on the side surface 11d of the seal ring 1. Furthermore, the force corresponding to the flow rate of oil is also applied to the groove 12.

<Second Embodiment>

Figure 6:
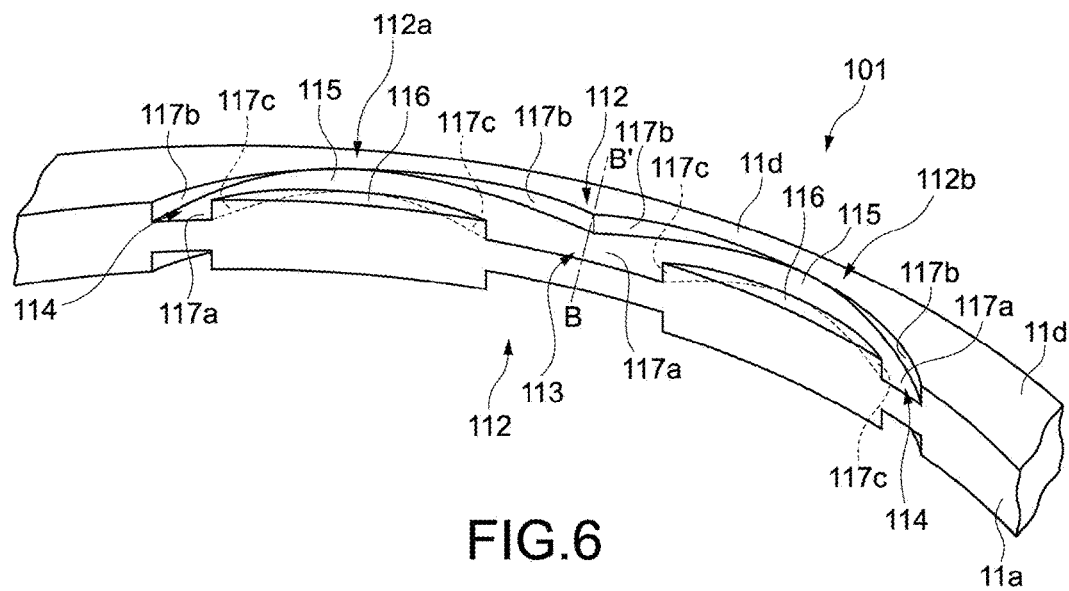
FIG. 6 A partially perspective diagram of a seal ring according to a second embodiment of the present invention.

FIG. 6 is a partially perspective diagram of a seal ring 101 according to a second embodiment of the present invention. The configuration of the seal ring 101 according to this embodiment is similar to those of the seal ring 1 according to the first embodiment except that those described below, and the description thereof will be omitted.

The seal ring 101 has a groove 112. The groove 112 includes a first end 113 and second ends 114 connected to the inner peripheral surface 11a. The second ends 114 are disposed at both ends sandwiching the first end 113 in a radial direction of the seal ring 101.

The groove 112 of the seal ring 101 has two grooves 112a, 112b sharing the first end 113. The groove 112a extends from the first end 113 to the second end 114 at a left side in an arc shape, and the groove 112b extends from the first end 113 to the second end 114 at a right side in an arc shape.

The groove 112a is configured similar to the groove 12 of the seal ring 101 according to the first embodiment. On the other hand, the groove 112b is configured to be symmetry with the groove 112a with respect to a cross-section along a B-B' line passing through a center of a radial direction of the first end 113.

Figure 7:
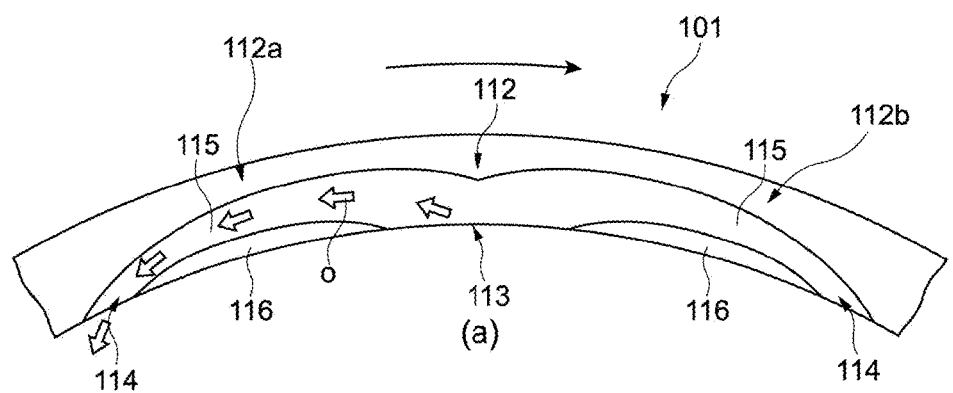
FIG. 7 A partially plan diagram of the seal ring.
Figure 7:
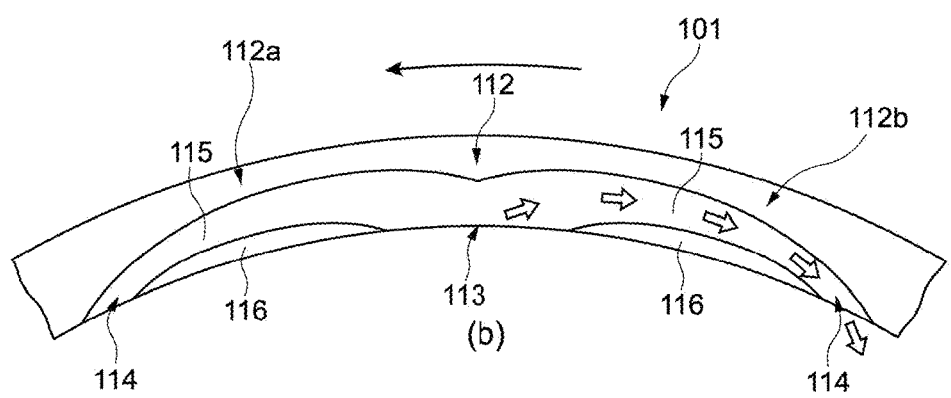

FIG. 7 is a diagram showing a flow of oil in the groove 12. In FIG. 7, the flow of oil in the groove 12 is represented by block arrows o when the seal ring 101 rotates in the arrow direction. When the seal ring 101 is rotated, oil tries to stay at the position by an inertial force, and the oil therefore flows through the groove 112 in a direction opposite to a rotation direction of the seal ring 101.

As shown in FIG. 7(a), when the seal ring 101 rotates clockwise, oil entered from the first end 113 into the groove 112 flows the groove 112a in a left direction, and is discharged from the second end 14 to an inner peripheral surface 11a side of the seal ring 101. On the other hand, as shown in FIG. 7(b), when the seal ring 101 rotates in a left direction, oil entered from the first end 113 into the groove 112 flows the groove 112b in a right direction, and is discharged from the second end 114 to an inner peripheral surface 11a side of the seal ring 101.

In this manner, in the seal ring 101 according to this embodiment, as oil flows into the groove 112 in any rotation direction, a frictional force between the seal ring 101 and the shaft 2 is inhibited. Accordingly, the seal ring 101 can be used without taking the rotation direction into consideration. Therefore, a step for assmbling the seal ring 101 may be simplified, which contributes to a decrease in manufacturing costs of a device on which the seal ring 101 is assembled.

In the seal ring 101, the groove 112a is continuous with the groove 112b at the first end 113, but the groove 112a and the groove 112b may be disposed separately. In this case, the first end 113 of the groove 112a and the first end 113 of the groove 112b are disposed separately.

<Third Embodiment>

Figure 8:
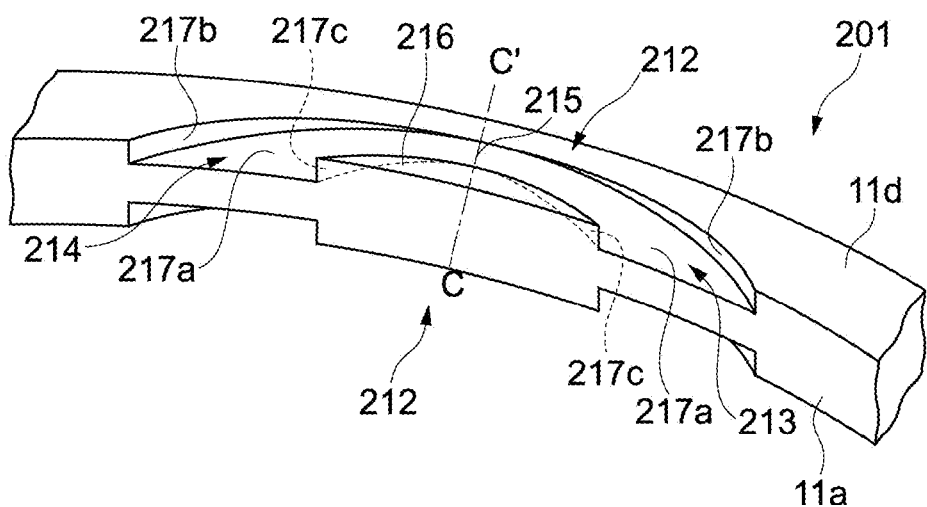
FIG. 8 A partially perspective diagram of a seal ring according to a third embodiment of the present invention.

FIG. 8 is a partially perspective diagram of a seal ring 201 according to a third embodiment of the present invention. The configuration of the seal ring 201 according to this embodiment is similar to those of the seal ring 1 according to the first embodiment except those described below, and the description thereof will be omitted.

The seal ring 201 has a groove 212. The groove 212 includes ends 213 and 214 connected to the inner peripheral surface 11a. The groove 212 extends in an arc shape between the ends 213, 214.

In the groove 212 of the seal ring 201, the section from the end 213 to a top 215 is configured similarly to the groove 12 of the seal ring 1 according to the first embodiment. In addition, the section from the end 214 to the top 215 in the groove 212 is configured such that a cross-section along a C-C' line passing through the top 215 is symmetry with the section from the end 213 to the top 215.

Figure 9:
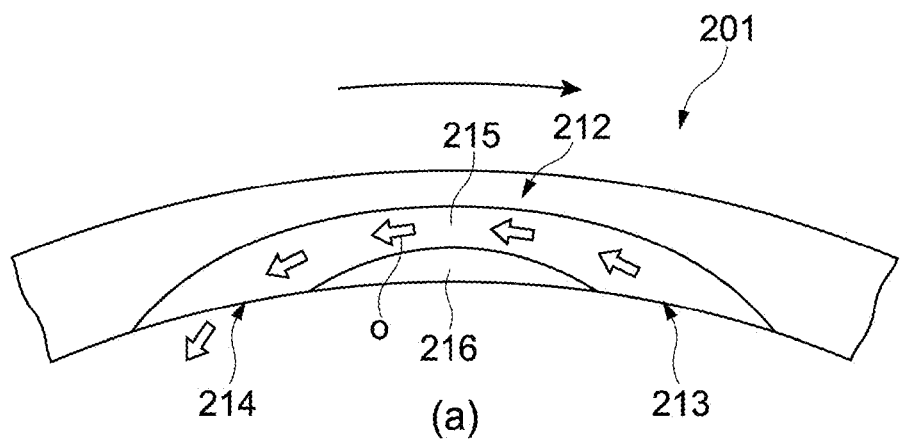
FIG. 9 A partially plan diagram of the seal ring.
Figure 9:
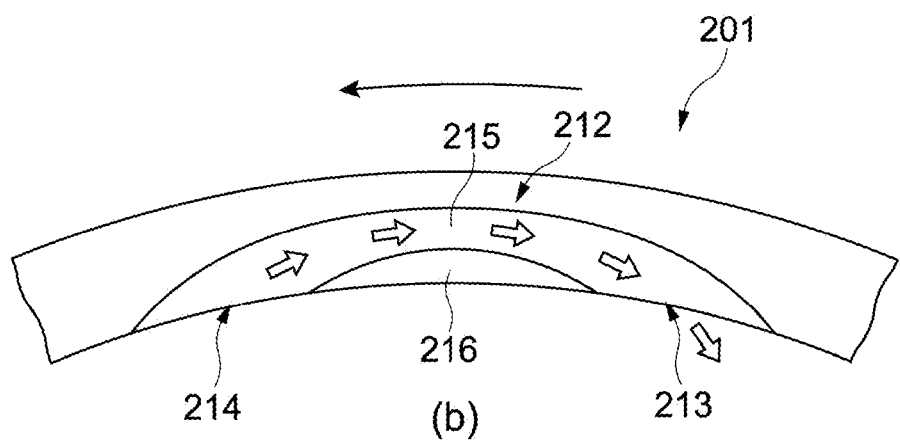

FIG. 9 is a diagram showing a flow of oil in the groove 212. In FIG. 9, the flow of oil in the groove 212 is represented by block arrows o when the seal ring 201 rotates in the arrow direction. When the seal ring 201 is rotated, oil tries to stay at the position by an inertial force, and the oil therefore flows through the groove 212 in a direction opposite to a rotation direction of the seal ring 201.

As shown in FIG. 9(a), when the seal ring 201 rotates clockwise, oil entered from the end 213 into the groove 219 flows the groove 212 in a left direction, and is discharged from the end 214 to the inner peripheral surface 11a side of the seal ring 201. In this case, the end 213 is configured as the first end for entering oil, and the end 214 is configured as the second end for discharging oil.

On the other hand, as shown in FIG. 9(b), when the seal ring 201 rotates in a left direction, oil entered from the end 214 into the groove 212 flows the groove 212 in a right direction, and is discharged from the end 213 to an inner peripheral surface 11a side of the seal ring 201. In this case, the end 214 is configured as the first end for entering oil, and the end 213 is configured as the second end for discharging oil.

In this manner, in the seal ring 201 according to this embodiment, as oil flows into the groove 212 in any rotation direction, a frictional force between the seal ring 201 and the shaft 2 is inhibited. Accordingly, the seal ring 201 can be used without taking the rotation direction into consideration. Therefore, a step for assmbling the seal ring 201 may be simplified, which contributes to a decrease in manufacturing costs of a device on which the seal ring 201 is assembled.

Furthermore, the groove 212 of the seal ring 201 has a simplified shape, and is therefore easily generated upon the production of the seal ring 201. Accordingly, the seal ring 201 can be produced at low costs. In addition, in the seal ring 201, as oil flows through the groove 212 throughout in any rotation direction, an area of a bottom surface 217a of the groove 212 on which oil affects is great. Accordingly, the seal ring 201 effectively provides an effect to decrease a friction loss.

<Fourth Embodiment>

Figure 10A:
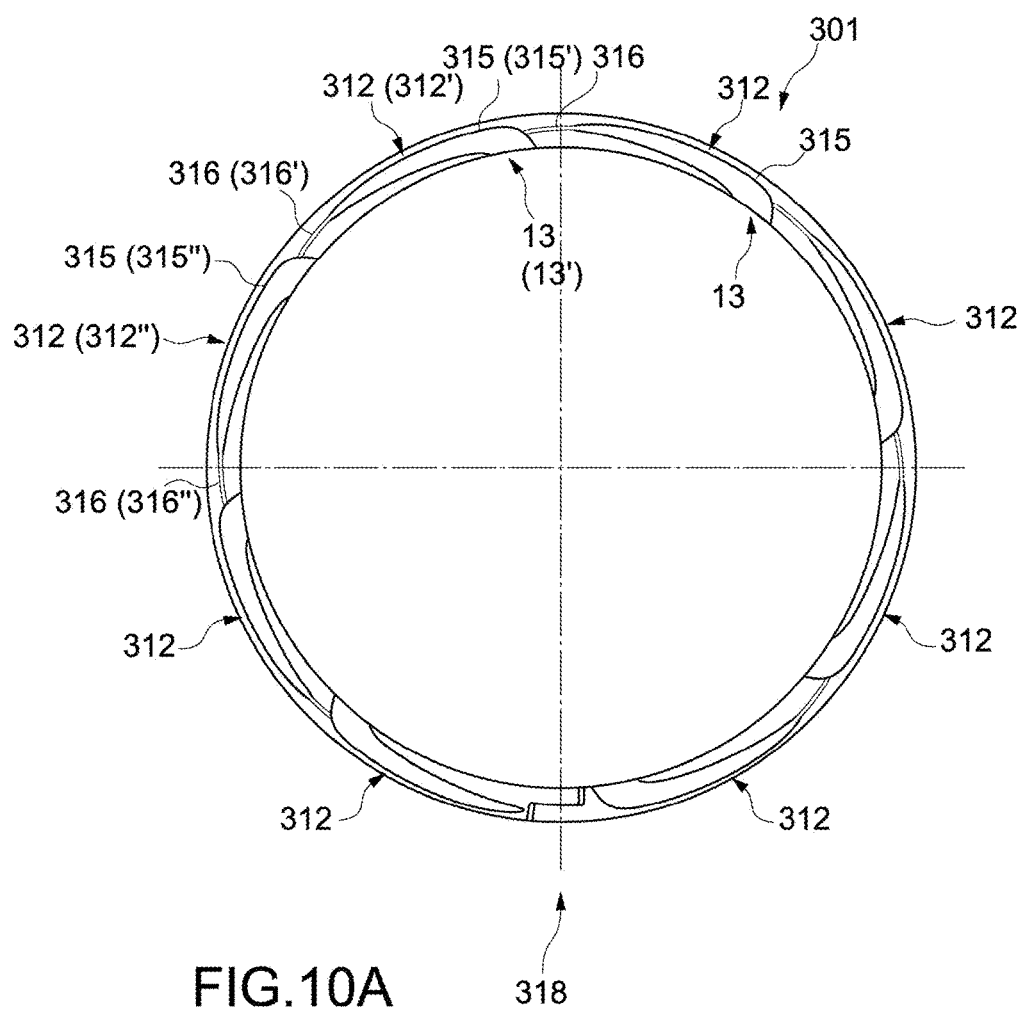
FIG. 10A A plan diagram of a seal ring according to a fourth embodiment of the present invention.
Figure 10B:
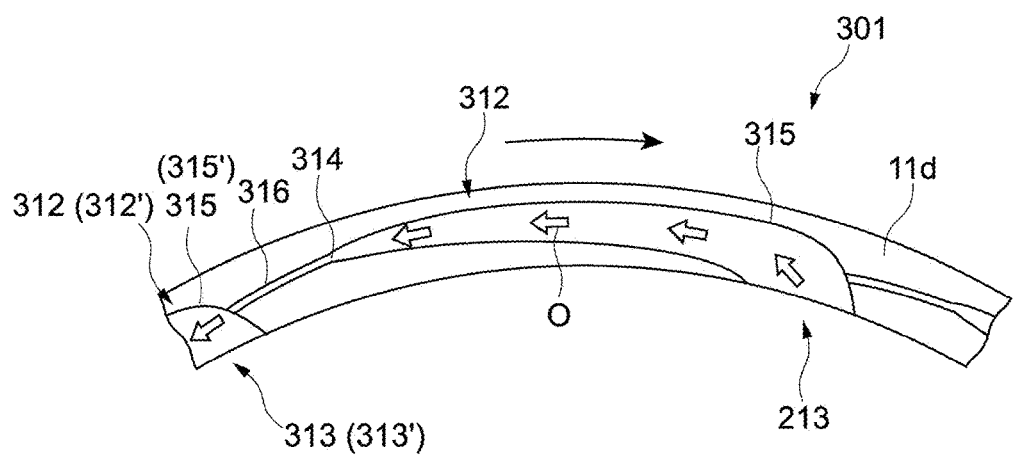
FIG. 10B A partially plan diagram of the seal ring shown in FIG. 10A.
Figure 10C:
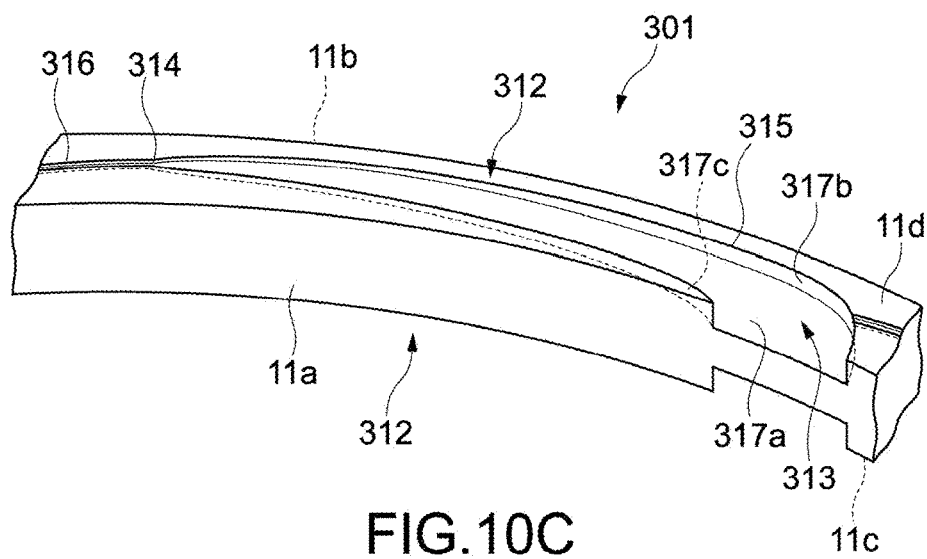
FIG. 10C A partially perspective diagram of the seal ring shown in FIG. 10A.

FIG. 10A, FIG. 10B and FIG. 10C show a seal ring 301 according to this embodiment. FIG. 10A is a plan diagram of the seal ring 301, FIG. 10B is a partially plan diagram of the seal ring 301, and FIG. 10C is a partially perspective diagram of the seal ring 301. The configuration of the seal ring 301 according to this embodiment is similar to those of the seal ring 1 according to the first embodiment except that those described below, and the description thereof will be omitted.

(Overall Configuration)

FIG. 10A shows an overall appearance of the seal ring 301. Eight grooves 312 having the same shape are disposed at side surface 11d of the seal ring 301. The eight grooves 312 are generally disposed at an equal interval, and have a 45-degree rotational symmetry as to the center axis R.

In the seal ring 301, the abutment 318 is disposed for easily mounting to the fitting groove 21 of the shaft 2. If a force is applied to the seal ring 301 in a radial direction, the seal ring 301 is elastically deformed to open the abutment 318. The seal ring 301 is attached to the fitting groove 21 of the shaft 2 with the abutment 318 open.

In FIG. 10B, the groove 312 of the seal ring 301 is shown enlarged. FIG. 10B is a diagram showing a flow of oil in the groove 312. In FIG. 10B, the flow of oil is represented by block arrows o when the seal ring 301 is rotated in the arrow direction.

When the seal ring 301 is rotated in the arrow direction, oil tries to stay at the position by an inertial force, and the oil therefore flows through the groove 312 in a direction opposite to a rotation direction of the seal ring 301. In other words, when the seal ring 301 is rotated clockwise, oil apparently flows through the groove 312 in a left direction.

(Groove 312)

In FIG. 10C, the groove 312 of the seal ring 301 is shown enlarged. The groove 312 is formed on the side surface 11c opposite to the side surface 11d of the seal ring 301. The groove 312 on the side surface 11c and the groove 312 on the side surface 11d are formed in a mirror-symmetry manner. Accordingly, the groove 312 on the side surface 11d will be described, and the description about the groove 312 on the side surface 11c will be omitted.

The groove 312 is configured of a pocket 315 and an undercut 316. The groove 312 includes a first end 313 connected to the inner peripheral surface 11a, and a second end 314 disposed between the inner peripheral surface 11a and the outer peripheral surface 11b.

The pocket 315 extends from the first end 313 to the second end 314 in a radial direction of the seal ring 301. The undercut 316 extends from the second end 314 to a direction opposite to the pocket 315 in the radial direction of the seal ring 301, and is connected to a pocket 315' of an adjacent groove 312' in an extension direction.

The pocket 315 has a bottom surface 317a, an outer peripheral surface 317b, and an inner peripheral surface 317c. A cross-section of the inner peripheral surface 11a of the first end 313 of the pocket 315 is rectangle. A depth of the first end 313 from the side surface 11d is about ¼ of the seal ring 301.

A width of the pocket 315 is successively narrowed from the first end 313 to the second end 314. In addition, a depth of the groove 312 from the side surface 11d is successively shallow from the first end 313 to the second end 314. In other words, a height of the bottom surface 317a of the pocket 315 is successively increased from the first end 313 to the second end 314.

When oil enters into the pocket 315 from the first end 313, a force corresponding to the oil hydraulic pressure is applied to the bottom surface 317a, the outer peripheral surface 317b, and an inner peripheral surface 317c of the pocket 315.

In addition, the bottom surface 317a of the pocket 315 is a slope ascendant from the first end 313 to the second end 314. Therefore, when oil flows from the first end 313 to the second end 314, a flow channel of oil is gradually narrowed down by the bottom surface 317a of the pocket 315. That is to way, the bottom surface 317a of the groove 312 applies a force to block a flow of oil to oil. On the contrary, oil applies a force corresponding to a flow rate of the oil to the bottom surface 317a of the groove 312.

Thus, two types of forces from oil, i.e., the force corresponding to the oil hydraulic pressure and the force corresponding to the flow rate of oil, are applied to the bottom surface 317a of the pocket 315.

In addition, the bottom surface 317a is narrowed down from the first end 313 to the second end 314 and the width is also narrowed down. Therefore, the cross-section of the flow channel of oil is narrowed down. When oil flow from the first end 313 to the second end 314, the flow channel of oil is successively narrowed down. Accordingly, when oil flows from the first end 313 to the second end 314, the flow rate of oil is gradually increased. As the flow rate of oil is increased, a force applied from oil to the bottom surface 317a of the pocket 315 is increased.

In the seal ring 301, a force applied to the bottom surface 317a of the pocket 315 from oil inhibits a force applied between the side surface 11d of the seal ring 301 and the side surface 21d of the fitting groove 21 of the shaft 2. In this manner, in the seal ring 301, a friction loss is decreased.

Note that the configuration of the pocket 315 is not limited to the configuration as described above, and may be such that oil can well flow.

The undercut 316 is a groove for expelling oil flowed to the second end 314 within the pocket 315 outside of the groove 312. The undercut 316 connects the second end 314 and a pocket 315' of an adjacent groove 312', and leads the oil flowed to the second end 314 within the pocket 315 to the pocket 315' of the adjacent groove 312'.

A width of the undercut 316 has a cross-sectional shape similar to the second end 314 of the pocket 315 in an entire length. In other words, the width of the undercut 316 is equivalent to the width of the second end 314 of the pocket 315, and a depth of the undercut 316 is equivalent to a depth of the second end 314 of the pocket 315.

As the cross-sectional shape of the undercut 316 is equivalent to the cross-sectional shape of the second end 314, the oil flowed to the second end 314 within the pocket 315 can flow smoothly into the undercut 316. The oil flowed into the undercut 316 passes through the undercut 316, and flows into the pocket 315' of the adjacent groove 312'.

The oil flowed from the undercut 316 of the groove 312 to the pocket 315' of the adjacent groove 312' passes through the pocket 315' of the groove 312' and the undercut 316', and flows into pocket 315" of groove 312" further adjacent to the groove 312' (see FIG. 10A). In this manner, in the seal ring 301, oil circulates within a plurality of grooves 312 disposed sequentially in the seal ring 301 in a radial direction.

In fact, a course of the oil flowed to the second end 314 within the pocket 315 of the groove 312 is roughly classified into the following three patterns (a), (b) and (c).

Pattern (a): passing through the undercut 316, flowing into the pocket 315' of the groove 312' adjacent to the groove 312, and passing through the pocket 315' of the groove 312' and an undercut 316'.

Pattern (b): Passing the undercut 316, flowing into the pocket 315' of the groove 312' adjacent to the groove 312, and being discharged from the first end 313' of the pocket 315' of the groove 312' to the inner peripheral surface 11a side of the seal ring 301.

Pattern (c): Forming an oil film between the side surface 11d of the seal ring 301 and the side surface 21d of the fitting groove 21 of the shaft 2.

In the seal ring 301, by forming the course in the pattern (a) or (b), an amount of oil taking the course in the pattern (c) is kept properly. In other words, in the seal ring 301, by the effect of the undercut 316, a thickness of the oil film between the side surface 11d of the seal ring 301 and the side surface 21d of the fitting groove 21 of the shaft 2 can be kept properly. Accordingly, the seal ring 301 can inhibit an oil leak.

Note that the configuration of the undercut 316 is not limited to the above-described configuration, and may be such that oil flowed to the second end 314 within the pocket 315 can be lead well to the pocket 315' of the adjacent groove 312'.

As described above, in the seal ring 301 according to this embodiment, by combining the pocket 315 with the undercut 316 in the groove 312, an oil leak can be inhibited while a friction loss is decreased.

(Comparative Embodiment)

Figure 11A:
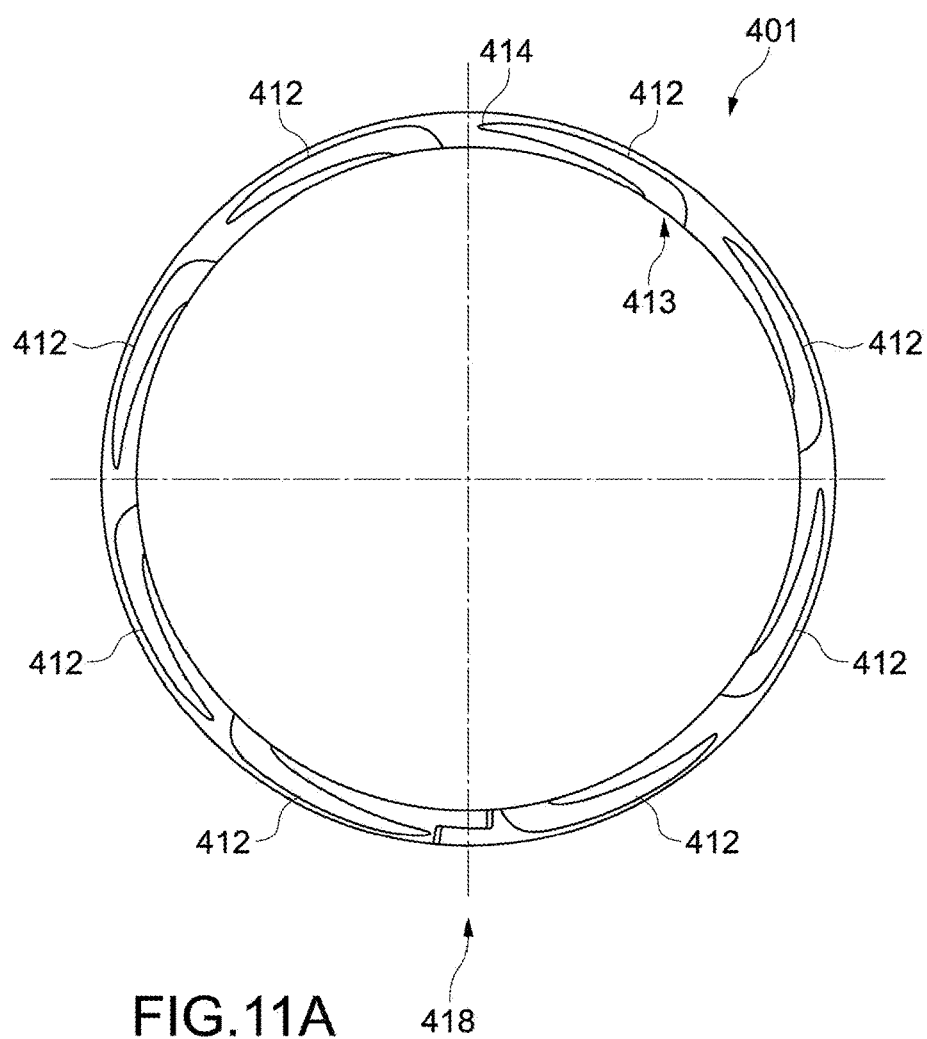
FIG. 11A A plan diagram of a seal ring relating to the present invention.
Figure 11B:
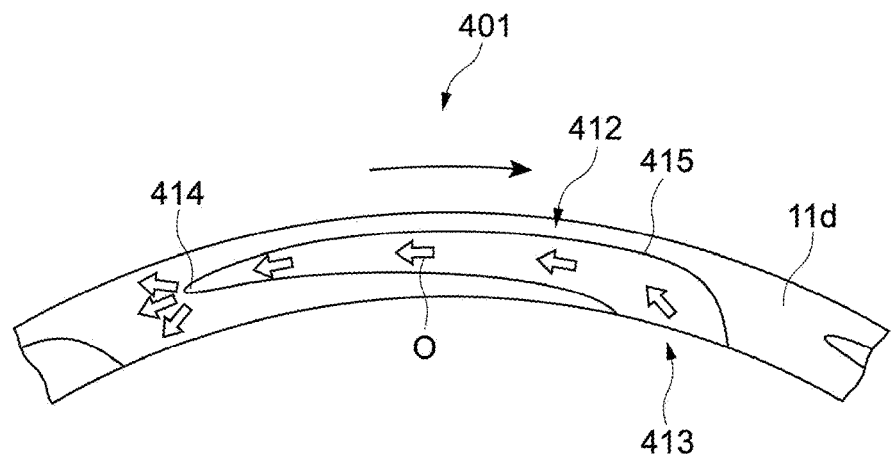
FIG. 11B A partially plan diagram of the seal ring shown in FIG. 11A.
Figure 11C:
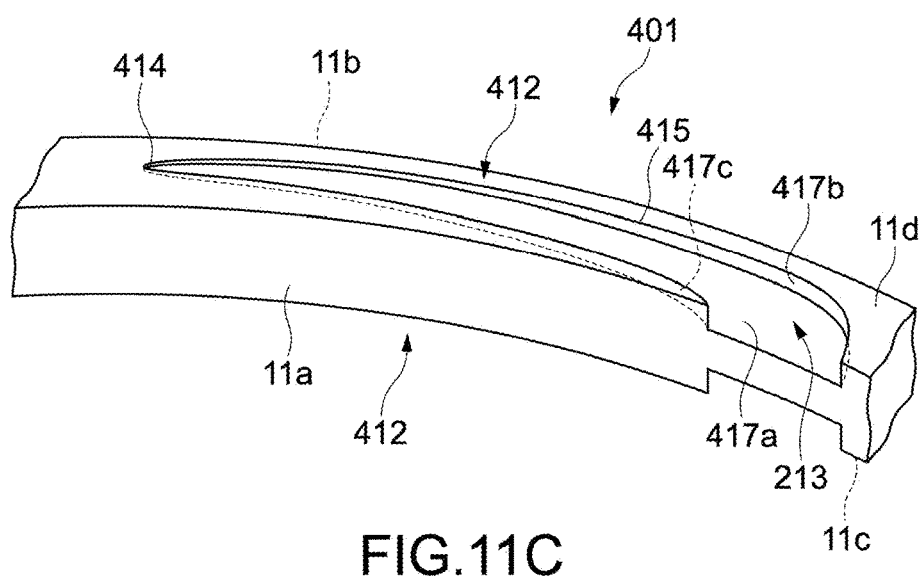
FIG. 11C A partially perspective diagram of the seal ring shown in FIG. 11A.

FIG. 11A, FIG. 11B and FIG. 11C show a seal ring 401 according to a comparative embodiment. FIG. 11A is a plan diagram of the seal ring 401, FIG. 11B is a partially plan diagram of the seal ring 401, and FIG. 11C is a partially perspective diagram of the seal ring 401.

The configuration of the seal ring 401 according to the comparative embodiment is different from the seal ring 301 according to this embodiment as to the groove, and other configuration is common. A groove 412 of the seal ring 401 is configured only of the pocket 415. That is to say, the seal ring 401 has no configuration corresponding to the undercut 316 of the seal ring 301.

In the seal ring 401 having no undercut, oil flowed to the second end 414 within the pocket 415 cannot take the course in the pattern (a) or (b), and has no choice to take the course in the pattern (c).

Accordingly, in the seal ring 401, the amount of oil taking the course in the pattern (c) is increased. In other words, in the seal ring 401, a thickness of the oil film between the side surface 11d of the seal ring 401 and the side surface 21d of the fitting groove 21 of the shaft 2 is increased. Therefore, in the seal ring 401, oil forming the oil film is easily leaked out at the outer peripheral surface 11b of the seal ring 401.

(Alternative Embodiments 1, 2)

Figure 12A:
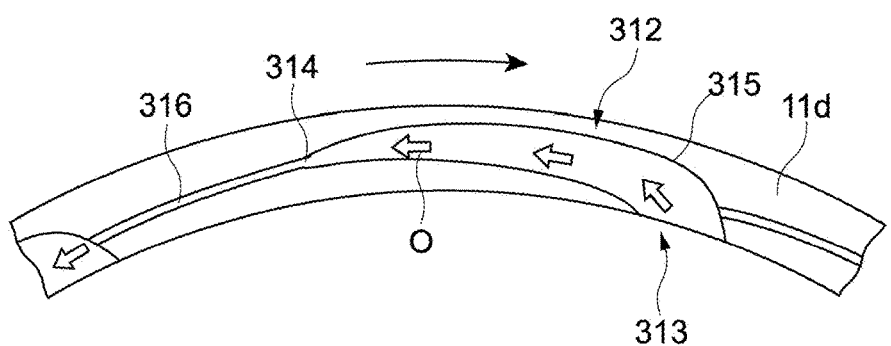
FIG. 12A A partially plan diagram of an alternative embodiment of the seal ring shown in FIG. 10A.
Figure 12B:
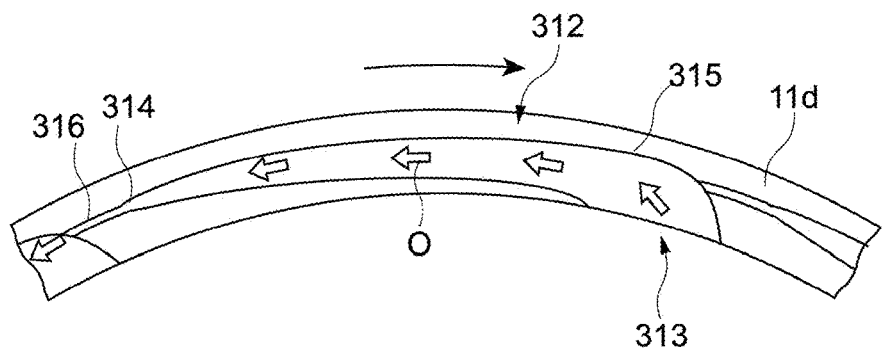
FIG. 12B A partially plan diagram of the alternative embodiment of the seal ring shown in FIG. 10A.

FIG. 12A is a partially plan diagram according to an alternative embodiment 1 of this embodiment of the seal ring. FIG. 12B is a partially plan diagram according to an alternative embodiment 2 of this embodiment of the seal ring. The configuration shown in FIG. 12A, the configuration shown in FIG. 12B, and the configuration showing in FIG. 10B according to this embodiment are mutually different in a balance between a size of the pocket 315 and a size of the undercut 316 of the groove 312 in a radial direction.

More specifically, a size of the undercut 316 to a size of the pocket 315 in the groove 312 according to the alternative embodiment 1 shown in FIG. 12A is larger than that in the groove 312 shown in FIG. 10B. On the other hand, a size of the undercut 316 to a size of the pocket 315 in the groove 312 according to the alternative embodiment 2 shown in FIG. 12B is smaller than that in the groove 312 shown in FIG. 10B.

In the seal ring according to the comparative embodiment 1 and the seal ring according to the comparative embodiment 2 just like the seal ring 301, by the effect of the pocket 315 and the undercut 316 in the groove 312, a friction loss can be decreased and an oil leak can be inhibited. Note that the balance between the size of the pocket 315 and the size of the undercut 316 of the groove 312 in a radial direction may be selected, as appropriate, so that the groove 312 can decrease a friction loss and inhibit an oil leak more effectively.

(Alternative Embodiment 3)

Figure 13A:
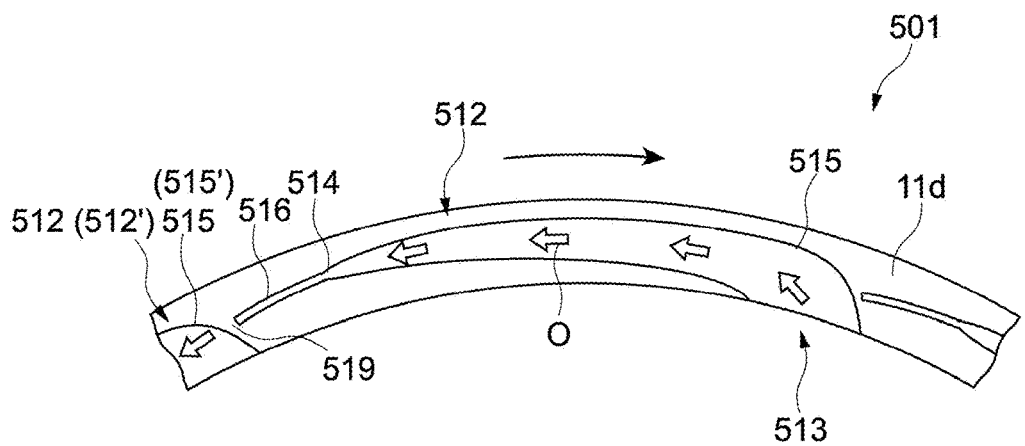
FIG. 13A A partially plan diagram of the alternative embodiment of the seal ring shown in FIG. 10A.
Figure 13B:
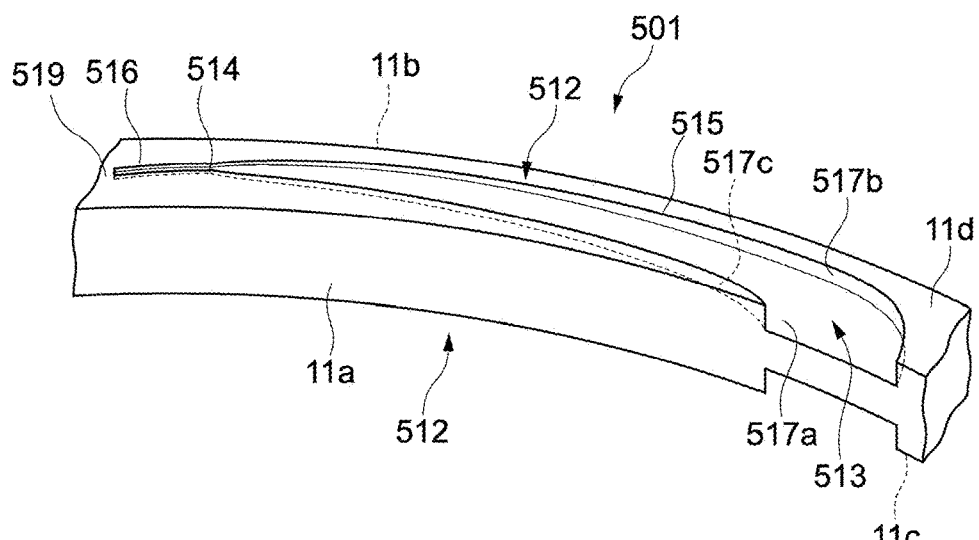
FIG. 13B A partially perspective diagram of the seal ring shown in FIG. 13A.

FIG. 13A and FIG. 13B show a seal ring 501 according to an alternative embodiment 3FIG. 13A is a partially plan diagram of the seal ring 501. FIG. 13B is a partially perspective diagram of the seal ring 501.

The configuration of the seal ring 501 according to the comparative embodiment 3 is different from the above-described seal ring 301 as to the undercut of the groove, and other configuration is common. In the above-described seal ring 301, the undercut 316 pierces through the pocket 315' of the adjacent groove 312', but in the seal ring 501, the undercut 516 does not reach a pocket 515' of an adjacent groove 512'. That is to say, in the seal ring 501, a barrier wall 519 is formed between the undercut 516 and the pocket 515' of the adjacent groove 512'.

In the seal ring 501, oil flowed to the second end 514 within the pocket 515 reaches the barrier wall 519 along the undercut 516. The oil reached the barrier wall 519 passes through the barrier wall 519 along a flow direction, and flows into the pocket 515' of the adjacent groove 512'.

In the seal ring 501, oil forms an oil film on the barrier wall 519, but the oil having the oil film flows promptly into the pocket 515' of the adjacent groove 512'. Therefore, the barrier wall 519 of the seal ring 501 less affects the thickness of the oil film. Accordingly, the seal ring 501 can inhibit an oil leak just like the seal ring 301.

The seal ring 501 is formed by injection molding, for example. By the injection molding, the seal ring 501 having the groove 512 may be formed. Also, a seal ring having no groove 512 may be formed. If the seal ring having no groove 512 is formed, the groove 512 is formed in the seal ring by addition working such as cutting working after the injection molding.

Here, it assumes that the undercut 516 of the groove 512 pierces through the pocket 515'of the adjacent groove 512. In this case, a corner where the undercut 516 is crossed with the pocket 515' becomes a complex shape. If the seal ring 501 having the groove 512 is formed by the injection molding, the corner may be therefore chipped upon pulling the seal ring 501 from a mold. Also, if the groove 512 is formed by the cutting working, the corner may be chipped.

However, in the seal ring 501, the undercut 516 of the groove 512 does not reach the pocket 515' of the adjacent groove 512'. Therefore, the corner of the undercut 516 of the groove 512 is prevented from chipping. Accordingly, in the seal ring 501, the groove 512 having an accurate shape is likely to be formed.

Furthermore, in the seal ring 501, the undercut 516 of the groove 512 does not pierce through the pocket 515', oil is prevented from back flowing from the pocket 515' to the undercut 516. In this manner, in the seal ring 501, a constant oil flow is kept in the groove 512.

<Fifth Embodiment>

Figure 14A:
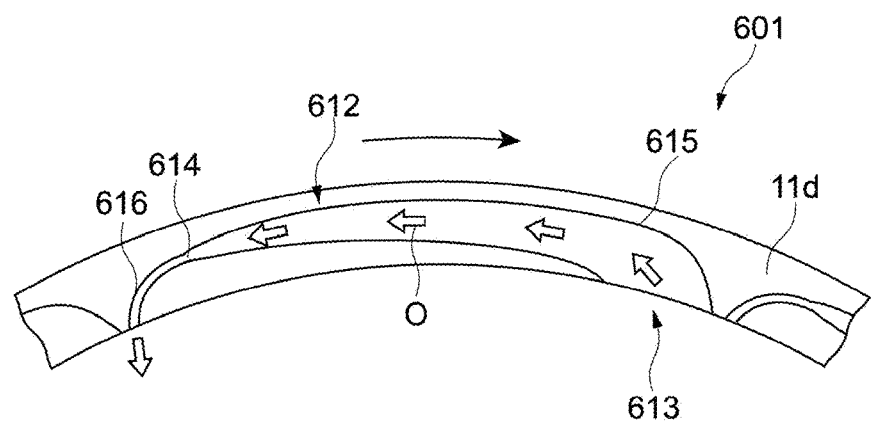
FIG. 14A A partially plan diagram of a seal ring according to a fifth embodiment of the present invention.
Figure 14B:
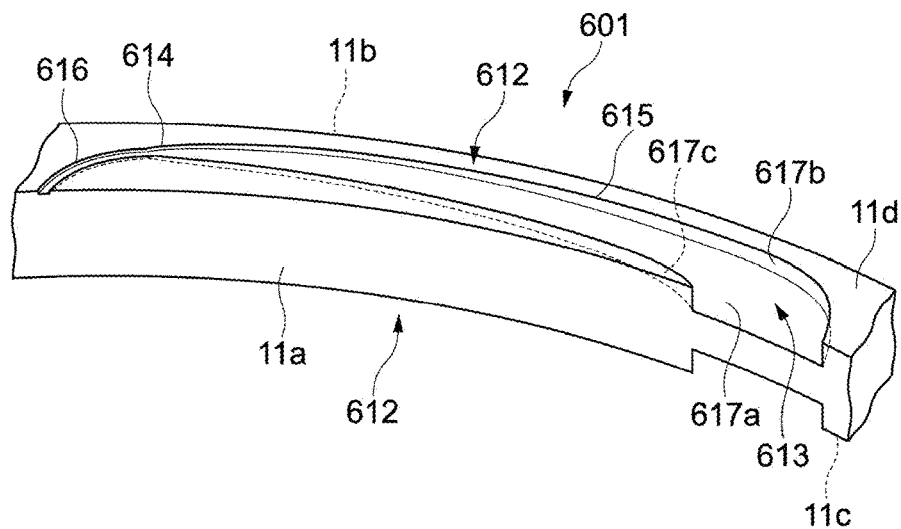
FIG. 14B A partially perspective diagram of the seal ring shown in FIG. 14A.

FIG. 14A and FIG. 14B show a seal ring 601 according to a fifth embodiment of the present invention. FIG. 14A is a partially plan diagram of the seal ring 601, and FIG. 14B is a partially perspective diagram of the seal ring 601.

The configuration of the seal ring 601 according to this embodiment is different from the seal ring 301 according to the fourth embodiment as to the undercut of the groove, and other configuration is common.

A groove 612 is configured of a pocket 615 and an undercut 616. The groove 612 includes a first end 613 connected to the inner peripheral surface 11a, and a second end 614 disposed between the inner peripheral surface 11a and the outer peripheral surface 11b.

The pocket 615 extends from the first end 613 to the second end 614 in a radial direction of the seal ring 601. The undercut 616 extends from the second end 614 to a direction opposite to the pocket 615, and is connected to the inner peripheral surface 11a of the seal ring 601.

The undercut 616 is a groove for expelling oil flowed to the second end 614 within the pocket 615 outside of the groove 612. A width of the undercut 616 has a cross-sectional shape similar to the second end 614 of the pocket 615 in an entire length. In other words, the width of the undercut 616 is equivalent to the width of the second end 614 of the pocket 615, and a depth of the undercut 616 is equivalent to a depth of the second end 614 of the pocket 615.

As the cross-sectional shape of the undercut 616 is similar to the cross-sectional shape of the second end 614, the oil flowed to the second end 614 within the pocket 615 can flow smoothly into the undercut 616. The oil flowed into the undercut 616 passes through the undercut 616, and is discharged from the inner peripheral surface 11a of the seal ring 601.

A course of the oil flowed to the second end 614 within the pocket 615 of the groove 612 is roughly classified into the following two patterns (a) and (b).

Pattern (a): passing through the undercut 616, and returning to the inner peripheral surface 11a side of the seal ring 601.

Pattern (b): Forming an oil film between the side surface 11d of the seal ring 601 and the side surface 21d of the fitting groove 21 of the shaft 2.

In the seal ring 601, by forming the course in the pattern (a), an amount of oil taking the course in the pattern (b) is kept properly. In other words, in the seal ring 601, by the effect of the undercut 616, a thickness of the oil film between the side surface 11d of the seal ring 601 and the side surface 21d of the fitting groove 21 of the shaft 2 can be kept properly. Accordingly, the seal ring 601 can inhibit an oil leak.

(Alternative Embodiment)

Figure 15A:
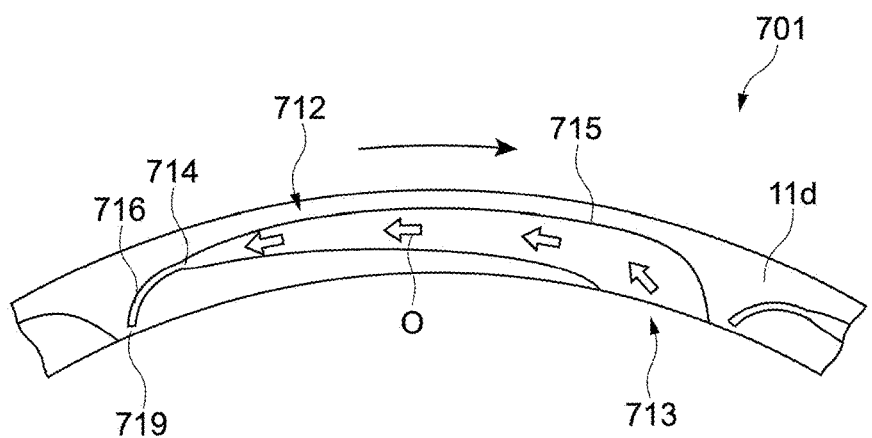
FIG. 15A A partially plan diagram of the alternative embodiment of the seal ring shown in FIG. 14A.
Figure 15B:
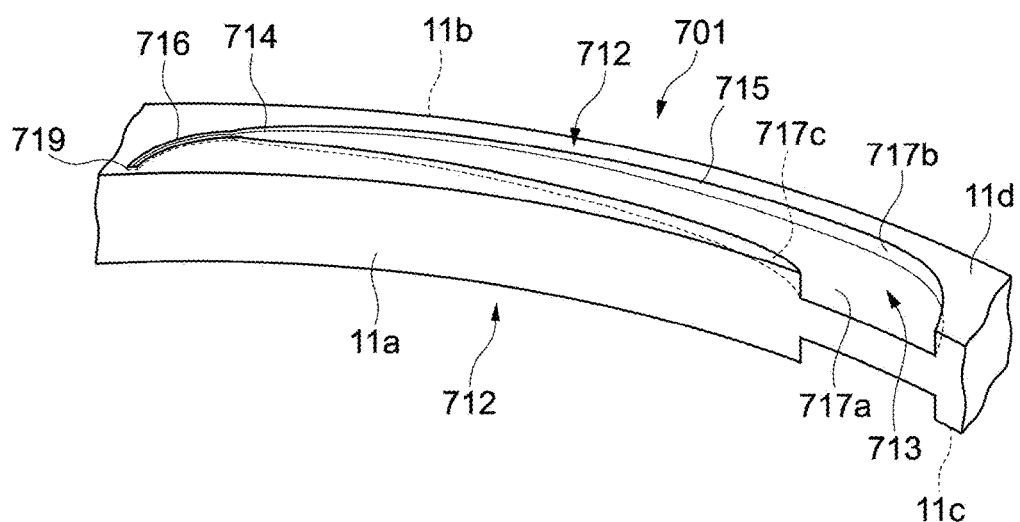
FIG. 15B A partially perspective diagram of the seal ring shown in FIG. 15A.

FIG. 15A and FIG. 15B show a seal ring 701 according to an alternative embodiment. FIG. 15A is a plan diagram of the seal ring 701. FIG. 15B is a partially plan diagram of the seal ring 701.

The configuration of the seal ring 701 according to the comparative embodiment is different from the above-described seal ring 601 as to the undercut of the groove, and other configuration is common. In the above-described seal ring 601, the undercut 616 pierces through the inner peripheral surface 11a of the seal ring 601, but in the seal ring 701, the undercut 716 does not reach the inner peripheral surface 11a of the seal ring 701. That is to say, in the seal ring 701, a barrier wall 719 is formed between the undercut 716 and the inner peripheral surface 11a of the seal ring 701.

In the seal ring 701, oil flowed to the second end 714 within the pocket 715 reaches the barrier wall 719 along the undercut 716. The oil reached the barrier wall 719 of the undercut 716 passes through the barrier wall 719 along a flow direction, and discharged from the inner peripheral surface 11a of the seal ring 701.

In the seal ring 701, oil forms an oil film on the barrier wall 719, but the oil having the oil film is discharged from the inner peripheral surface 11a of the seal ring 701. Therefore, the barrier wall 719 of the seal ring 701 less affects the thickness of the oil film. Accordingly, the seal ring 701 can inhibit an oil leak just like the seal ring 601.

Here, it assumes that the undercut 716 of the groove 712 pierces through the inner peripheral surface 11a of the seal ring 701. In this case, a corner where the undercut 716 is crossed with the inner peripheral surface 11a becomes a complex shape. If the seal ring 701 having the groove 712 is formed by the injection molding, the corner may be therefore chipped upon pulling the seal ring 701 from a mold. Also, if the groove 712 is formed by the cutting working, the corner may be chipped.

However, in the seal ring 701, the undercut 716 of the groove 712 does not reach the inner peripheral surface 11a of the seal ring 701. Therefore, the corner of the undercut 716 of the groove 712 is prevented from chipping. Accordingly, in the seal ring 701, the groove 712 having an accurate shape is likely to be formed.

Furthermore, in the seal ring 701, the undercut 716 of the groove 712 does not pierce through the inner peripheral surface 11a, oil is prevented from back flowing from the inner peripheral surface 11a side to the undercut 716. In this manner, in the seal ring 701, a constant oil flow is kept in the groove 712.

While the embodiments of the present invention is described as above, the present invention is not limited to the above-described embodiments. It should be understood that variations and modifications may be made without departing from the scope of the present technology.

For example, the grooves are disposed at both side surfaces of the seal ring in the above described embodiments. However, the groove may be disposed at least one of the side surfaces of the seal ring. In addition, the grooves on both side surfaces of the seal ring may not be in a mirror-symmetry manner. For example, in the seal ring, the groove according to the first embodiment may be disposed at one side surface, and the groove according to the second embodiment may be disposed at the other side surface.

DESCRIPTION OF SYMBOLS 1 seal ring
11a inner peripheral surface
11b outer peripheral surface
11c, 11d side surface
11d inner peripheral surface
12 groove
13, 14 end
15 top
16 inner peripheral wall
17a bottom surface
17b outer peripheral surface
17c inner peripheral surface
2 shaft
3 housing

The invention claimed is:

1. A seal ring, comprising: a center axis being a rotation center;
   an outer peripheral surface being an outward cylindrical surface whose center is positioned at the central axis;
   an inner peripheral surface being an inward cylindrical surface disposed between the center axis and the outer peripheral surface whose center is positioned at the central axis;
   a side surface connecting the outer peripheral surface and the inner peripheral surface; a groove formed in a dented groove from the side surface, extending along a radial direction spaced from the outer peripheral surface, having a first end connected to the inner peripheral surface and a second end at an opposite side of the first end, extending in an arc shape between the first end and the second end, and returning oil entered from the first end to an inner peripheral surface side via the second end; and
   an inner peripheral wall separating the groove from the inner peripheral surface between the first end and the second end,
   wherein the groove comprises an inner side surface, an outer side surface, and a bottom surface between and connected to the inner side surface and the outer side surface,
   wherein the inner side surface of the groove is connected to the inner peripheral wall and extends in the arc shape with respect to the inner peripheral surface between the first end and the second end, and
   wherein the outer side surface of the groove is opposite to the inner side surface of the groove and extends in the arc shape with respect to the inner peripheral surface between the first end and the second end;
   wherein the groove has a pocket extending between the first end and the second end, and an undercut extending from the first end in a direction opposite to the pocket;
   wherein a plurality of the grooves are disposed successively along the radial direction;
   wherein the undercut of the groove extends to the pocket of a groove of an adjacent groove.

2. The seal ring according to claim 1, wherein
the second end is connected to the inner peripheral surface.

3. The seal ring according to claim 2, wherein
the groove has a top with a shallowest depth from the side surface.

4. The seal ring according to claim 3, wherein
a depth of the groove from the side surface becomes successively shallow from the first end to the top.

5. The seal ring according to claim 3, wherein
the width of the groove is successively narrowed down from the first end to the top.

6. The seal ring according to any one of claim 2, wherein
the groove is configured of a first groove and a second groove,
the first groove and the second groove share the first end, and
the second ends are disposed at opposite sides across the first end.

7. The seal ring according to any one of claim 2, wherein
the groove has a symmetry shape in a radial direction of the inner peripheral surface.

8. The seal ring according to claim 2, wherein
a plurality of the grooves is disposed to have a rotational symmetry as to the center axis.

9. The seal ring according to claim 1, wherein a width of the pocket is shallowest at the second end, and a width of the undercut is equivalent to a width of the second end.

10. The seal ring according to claim 1, wherein a depth of the pocket is shallowest at the second end, and a depth of the undercut is equivalent to the second end.

11. The seal ring according to claim 1, wherein the undercut extends to the inner peripheral surface.

12. The seal ring according to claim 11, wherein
the undercut pierces through the inner peripheral surface.

13. The seal ring according to claim 11, wherein
the undercut is disposed spaced from the inner peripheral surface.

14. The seal ring according to claim 1, wherein the undercut pierces through the pocket of the adjacent groove.

15. The seal ring according to claim 1, wherein the undercut is disposed spaced from the pocket of the adjacent groove.

* * * * *